(12) United States Patent
Chin et al.

(10) Patent No.: US 7,996,883 B2
(45) Date of Patent: Aug. 9, 2011

(54) CENTRALIZED IDENTITY MANAGEMENT FOR DELEGATING RESOURCE MANAGEMENT IN A TECHNOLOGY OUTSOURCING ENVIRONMENT

(75) Inventors: Arthur Chin, Foster City, CA (US); Milind Parikh, Cupertino, CA (US); Parmeet Chaddha, Foster City, CA (US)

(73) Assignee: International Business Machines Corporation, Armonk, NY (US)

( * ) Notice: Subject to any disclaimer, the term of this patent is extended or adjusted under 35 U.S.C. 154(b) by 1935 days.

(21) Appl. No.: 11/010,138

(22) Filed: Dec. 9, 2004

(65) Prior Publication Data

US 2006/0130065 A1 Jun. 15, 2006

(51) Int. Cl.
*G06F 7/04* (2006.01)
(52) U.S. Cl. .............................................. 726/6; 726/18
(58) Field of Classification Search ................. 726/6, 18
See application file for complete search history.

(56) References Cited

U.S. PATENT DOCUMENTS

| | | | | |
|---|---|---|---|---|
| 5,771,354 A * | 6/1998 | Crawford | ........................ | 709/229 |
| 5,774,531 A * | 6/1998 | Johnson | ................... | 379/112.01 |
| 6,732,181 B2 * | 5/2004 | Lim et al. | ....................... | 709/229 |
| 6,763,376 B1 * | 7/2004 | Devine et al. | ................. | 709/223 |
| 7,159,031 B1 * | 1/2007 | Larkin et al. | .................. | 709/238 |
| 7,246,122 B2 * | 7/2007 | Lucovsky | ........................ | 707/10 |
| 7,444,398 B1 * | 10/2008 | Matthews | ....................... | 709/224 |
| 2002/0010798 A1 * | 1/2002 | Ben-Shaul et al. | ............ | 709/247 |
| 2002/0069369 A1 * | 6/2002 | Tremain | ......................... | 713/201 |
| 2002/0158899 A1 * | 10/2002 | Raymond | ....................... | 345/736 |
| 2003/0028790 A1 * | 2/2003 | Bleumer et al. | ............... | 713/189 |
| 2003/0041238 A1 * | 2/2003 | French et al. | .................. | 713/153 |
| 2003/0074580 A1 * | 4/2003 | Knouse et al. | ................. | 713/201 |
| 2003/0145074 A1 * | 7/2003 | Penick | ........................... | 709/223 |
| 2003/0191911 A1 * | 10/2003 | Kleinschnitz et al. | ......... | 711/154 |
| 2004/0010607 A1 * | 1/2004 | Lee et al. | ....................... | 709/229 |
| 2004/0221179 A1 * | 11/2004 | Seshadri | ........................ | 713/202 |
| 2004/0250141 A1 * | 12/2004 | Casco-Arias et al. | ......... | 713/202 |
| 2005/0114359 A1 * | 5/2005 | Li et al. | ........................... | 707/100 |
| 2005/0198196 A1 * | 9/2005 | Bohn et al. | ..................... | 709/217 |
| 2006/0107311 A1 * | 5/2006 | Dawson et al. | .................... | 726/5 |
| 2006/0293936 A1 * | 12/2006 | Breiter et al. | ...................... | 705/8 |

\* cited by examiner

*Primary Examiner* — Techane J Gergiso
(74) *Attorney, Agent, or Firm* — Yee & Associates, P.C.; Arthur J. Samodovitz

(57) ABSTRACT

Delegating resource management to customers in a technology outsourcing environment includes providing the customer with a secured user interface (e.g., HTML pages) for selecting one or more parameters (e.g., User Ids, application name and version, etc.) associated with a resource management task (e.g., password management). The parameters are used to automatically perform the task using a centralized identity management system and repository for storing and updating data, such as data associated with customers, User Ids, environments, applications and application versions. Such a system and method enables the delegation of resource management tasks across multiple environments hosting disparate hardware and software platforms, including multiple versions of applications.

27 Claims, 11 Drawing Sheets

CENTRALIZED IDENTITY MANAGEMENT FOR DELEGATING RESOURCE MANAGEMENT IN A TECHNOLOGY OUTSOURCING ENVIRONMENT

TECHNICAL FIELD

The disclosed embodiments relate generally to technology outsourcing environments, and more particularly to solutions for delegating resource management to customers of technology outsourcing environments.

BACKGROUND

The management of Information Technology (IT) operations has become increasingly difficult due to the lack of an automated and integrated approach to technology resource management. Many customers are now demanding from their outsourcing partners technology resource management solutions that tie demand, service level agreements, assets, projects, labor, knowledge, automations and provisioning for corporate IT into one automated and integrated system. An important component of technology resource management is the ability to delegate at least some management tasks to the customer.

When a customer submits a resource management request, a resource provider employee assigned to that customer will typically carry out the request manually for each environment owned by the customer. For example, a customer may request a password change for one or more users spanning one or more environments. Such tasks, however, can require administrating password changes manually across multiple environments running one or more versions of applications in various hardware and software configurations. When the number of administrative tasks is multiplied by a large number of customers and end users, it becomes apparent that a simple administrative task can consume significant human capital. Moreover, as a resource provider's customer base grows, the amount of knowledge its employees need to service those customers grows. The acquisition and updating of such knowledge may require significant investments in training, which can be difficult to recapture from the customer.

Therefore, what is needed is an integrated and automated solution for delegating resource management tasks to customers without the intervention of resource provider personnel, thereby providing the customer with greater control over its operations. Such a solution should enable the resource provider to realize cost savings by reducing the number of personnel and training needed to service customer requests.

SUMMARY OF THE EMBODIMENTS

Delegating resource management to customers in a technology outsourcing environment includes providing the customer with a secured user interface (e.g., HTML pages) for selecting one or more parameters (e.g., User Ids, application name and version, etc.) associated with a resource management task (e.g., password management). The parameters are used to automatically perform the task using a centralized identity management system and repository for storing and updating data, such as data associated with customers, User Ids, environments, applications and application versions. Such a system and method enables the delegation of resource management tasks across multiple environments hosting disparate hardware and software platforms, including multiple versions of applications.

In some embodiments, a method of delegating resource management tasks in a technology outsourcing environment includes receiving a request to perform a resource management task; selecting at least two environments to be managed from a plurality of environments in the technology outsourcing environment, wherein the at least two environments include different configurations; and automatically performing the requested task in the two environments.

In some embodiments, a system for delegating resource management tasks in a technology outsourcing environment includes: a central repository configured to store information for users of at least two environments of a plurality of environments in the technology outsourcing environment, wherein the at least two environments include different configurations and are associated with different customers; and a centralized identity management system coupled to the central repository and configured to automatically perform a resource management task using the user information stored in the central repository.

DESCRIPTION OF EMBODIMENTS

System Overview

The description that follows makes repeated references to various naming conventions, variables and utilities used in conventional computing platforms, networks and database environments (e.g., UNIX, WINDOWS, ORACLE, etc.). It is assumed that the reader has a basic understanding of at least some of these widely used technologies or can review one or more of the publicly available manuals or textbooks describing these technologies.

Figure 1:
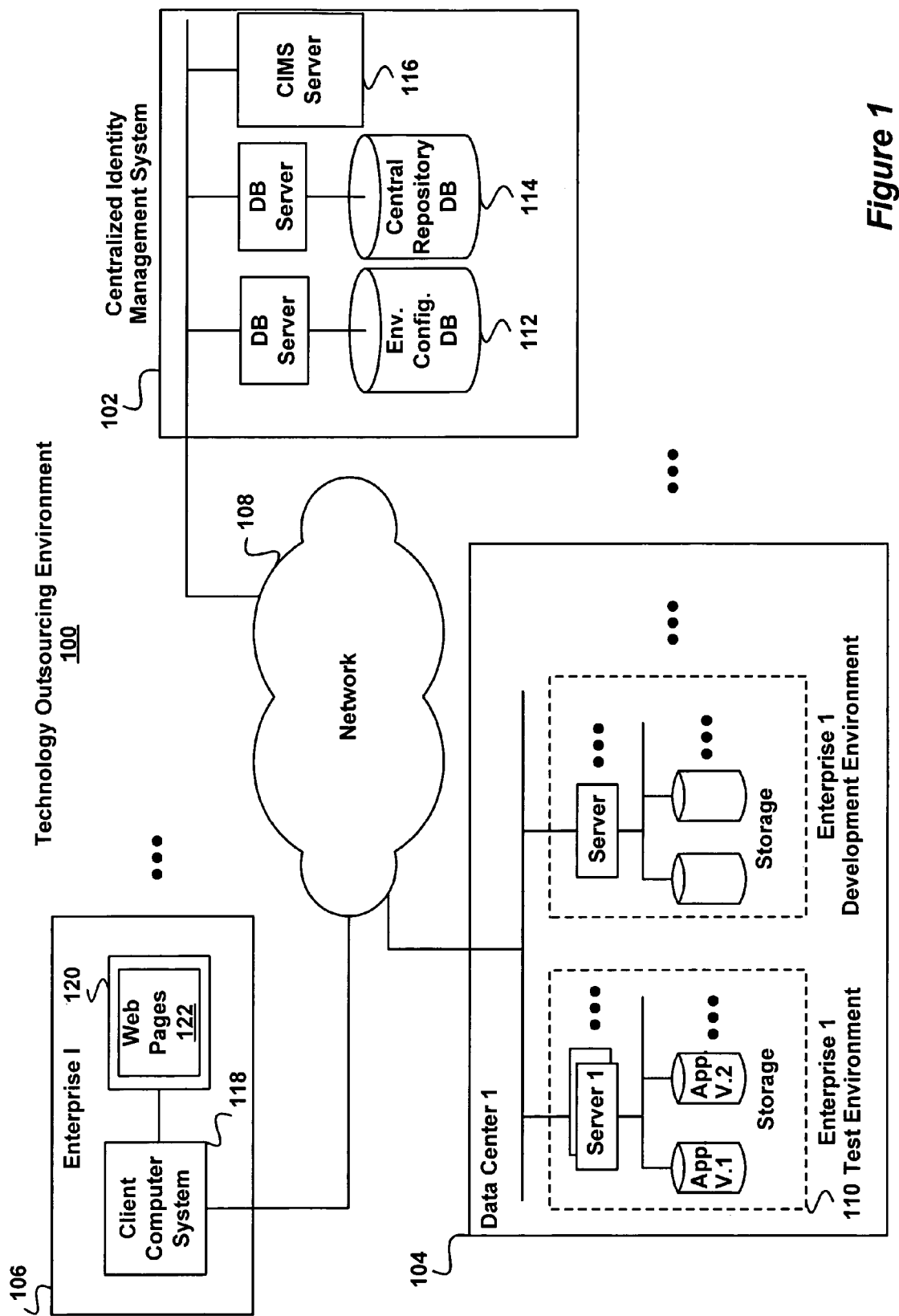
FIG. 1 is a block diagram of a technology outsourcing environment including a centralized identity management system (CIMS) for delegating resource management tasks to customers.

FIG. 1 is a block diagram of a technology outsourcing environment 100 for delegating resource management tasks (e.g., user password management, swapping, cloning, etc.) to customers. In some embodiments, the environment 110 includes a computer network 108 (e.g., the Internet) for communicating data and other information between a CIMS 102, one or more data centers 104 and one or more enterprises 106. In some embodiments, the environment 100 is managed by one or more third party technology resource providers, such as an application service provider (ASP). In other embodiments, the environment 100, or a portion thereof, is managed by the enterprise 106. The outsourcing environment 100 is not limited to the configuration shown in FIG. 1. Rather, it is one example of an outsourcing environment that could benefit from one or more features of the disclosed embodiments. Other examples of technology outsourcing environments are described in U.S. patent application Ser. No. 10/174,306, filed Jun. 17, 2002, entitled "Method and Apparatus for Management of Hosted Applications," Ser. No. 10/187,146, filed Jun. 28, 2002, entitled "Method and Apparatus For Technology Resource Management," and Ser. No. 10/412,549, filed Apr. 11, 2003, entitled "Method and Apparatus For Access Management," each of which is incorporated by reference herein in its entirety.

The enterprise 106 (e.g., small business, corporation, organization, etc.) includes a client computer system 118 coupled to a display device 120 (e.g., monitor) for presenting Web pages 122 to a user, which in some embodiments are received from a Web page server located in the CIMS 102. The client computer system 118 includes an operating system and other software for communicating with devices and systems via the network 108, as described more fully with respect to FIG. 2. In some embodiments, the client computer system 118 includes a Web browser (e.g., MICROSOFT EXPLORER) for presenting Web pages received from one or more Web servers via the network 108. In such embodiments, Web pages can be served to the client computer system 118 based on specific access rights. In other embodiments, the client computer system 118 can interact with the CIMS 102 automatically using batch programs in accordance with a scheduler program and/or monitoring/audit log.

The CIMS 102 includes a CIMS server 116, a customer and environment configuration database 112 and a central repository 114, which are coupled to a local network (e.g., LAN, WAN, WLAN, VLAN) via one or more database servers, as shown in FIG. 1. The CIMS server 116 manages communications with enterprise(s) 106 and data center(s) 104. For example, the CIMS server 116 manages and executes resource management requests received from the enterprise 106 by using data and other information stored in the databases 112, 114. The CIMS server 116 runs software for communicating with servers in environments 110 located in data center 104.

In some embodiments, the central repository 114 is a database that includes user information which is periodically refreshed or updated from the customer and environment configuration database 112, as described more fully with respect to FIG. 5. The customer and environment configuration database 112 (e.g., an extensible markup language (XML) database) includes configuration data for the one or more environments 110 in the one or more data centers 104. In some embodiments, the databases 112, 114 are coupled to a local network via one or more database servers, which are coupled to a larger network (e.g., Internet) for communicating with data center(s) 104 and/or enterprise(s) 106.

The data center 104 includes multiple environments 110, each having a customer specified hardware and software configuration. In technology outsourcing environments, it is typical for a customer to outsource one or more environments for each stage of product development, including environments for development, testing, user acceptance, training, demonstration and production. Often each environment includes a different hardware and software configuration and will typically employ some level of restricted access to users. For example, software engineers often have access to development and test environments, while end user customers often have access to user acceptance, training, demonstration and production environments, but not development or testing environments.

The hardware and software configurations in the environments 110 can include one or more servers (e.g., Web applications servers, file servers, database servers, transaction servers, object application servers, etc.) running one or more operating systems (e.g., UNIX, WINDOWS NT or 2000) for hosting one or more versions of one or more Web applications. Some of these applications may include database management systems (e.g., ORACLE 9i, MICROSOFT SQL) or one or more storage area networks (SAN) for storing customer data and providing backup, refresh and restore operations. Other applications provide customers with various business management solutions, including without limitation customer relationship management (CRM), financial management, human capital management, supplier relationship management, service automation, and any other business functions for which software vendors have provided solutions. Technology resources (e.g., servers, storage devices, etc.) can be dedicated to a single customer or shared by multiple customers (e.g., multi-tenant systems).

A requestor (e.g., system administrator, developer, performer, business executive, etc.) working for an enterprise 106 initiates a resource management request (e.g., a password change or reset) via one or more Web page(s) 122, which can be presented to the administrator through a browser window, as described more fully with respect to FIG. 4. In some embodiments, an Application server (e.g., the Java based Tomcat server) in the CIMS 102 provides one or more Web pages 122 containing user interface mechanisms (e.g., dialogue boxes, buttons, etc.) for enabling the user to communicate requests and responses. The client computer system 118 can use standard communication protocols to package the request(s) and send them securely to the CIMS 102 via network 108 to be processed by the CIMS server 116. Based on the scope and nature of the request (e.g., changing passwords of users 1 and 2 in a test environment 110), the CIMS server 102 searches the central repository 114 for user data and the environment configuration database 112 for configuration information. The users and/or environment configuration data is then used to generate one or more scripts (e.g., secure shell, perl, Bourne, Korn, C, etc.) or programs containing one or more operating system commands, variables and/or native utilities (e.g., the "% passwd" command in UNIX) to perform the user's request (e.g., changing passwords for multiple users across multiple environments). In some embodiments, the requestor with the correct privileges and access rights may service the request themselves via the Web by invoking a self-service functions as administrators (with the proper restrictions) without coordinating with an outside administrator (e.g., ASP administrator).

Figure 2:
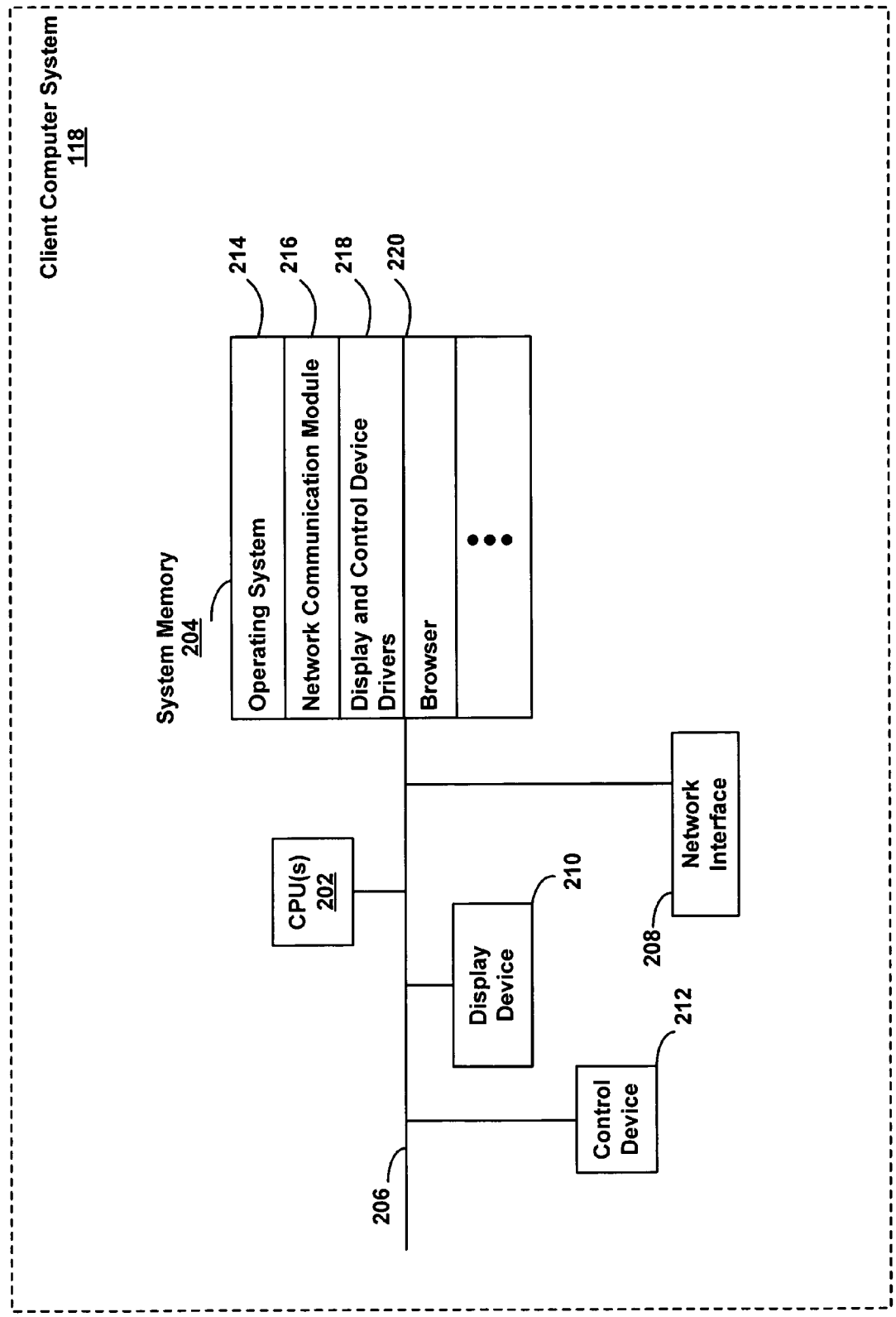
FIG. 2 is a block diagram of one embodiment of the client computer system shown in FIG. 1.

FIG. 2 is a block diagram of the client computer system 118 shown in FIG. 1. In some embodiments, the client computer system 118 (e.g., a personal computer, workstation, etc.) includes a system memory 204 spanning one or more memory hierarchies which can include one or more types of memory devices (e.g., RAM, ROM, hard discs, optical discs, etc.), one or more processors 202, a network interface 208, a control device 212 (e.g., mouse, keyboard, etc.) and a display device 210 (e.g., a monitor), each of which is coupled to a bus 206 (e.g., PCI, ISA, etc.). The system memory 204 includes an operating system (e.g., UNIX, WINDOWS 2000, LINUX, SOLARIS, etc.), a network communication module 216 (e.g., TCP/IP software), display and control device drivers 218, and a Web browser 220 (e.g., MICROSOFT EXPLORER). Program instructions are stored in a functional form in a computer readable storage medium for execution by one or more processors 202 in memory. In these illustrative examples, a hard disc and an optical disc are examples of a computer readable storage medium. RAM in system memory 204 is an example of a memory. A hard disc and an optical disc in system memory 204 is an example of a computer readable storage medium.

A requestor operates the control device 212 to make various requests in response to the Web pages 122 presented on the display device 208. The network interface 208 couples the client computer system 118 to the local network 206 to facilitate communication with other devices and systems on the network 108, such as the CIMS 102. The network communication module 216 includes various software components for securely communicating with other devices and systems over the network 108, including without limitation transmission control protocol (TCP), internet protocol (IP), hypertext transfer protocol (HTTP), distributed component object model (DCOM), CORBRA internet inter-orb protocol (IIOP), Java Applets, file transfer protocol (FTP), dynamic host configuration protocol (DHCP), secure sockets layer (SSL), transport layer security (TLS) and the like. The operating system provides low level administrative functions and control. The display and control device drivers 218 facilitate control of the display and control devices 210, 212, respectively. The Web browser 220 presents Web pages 122 to the user through one or more browser windows and facilitates the user's interactions with other devices and systems coupled to the network 108.

Figure 3:
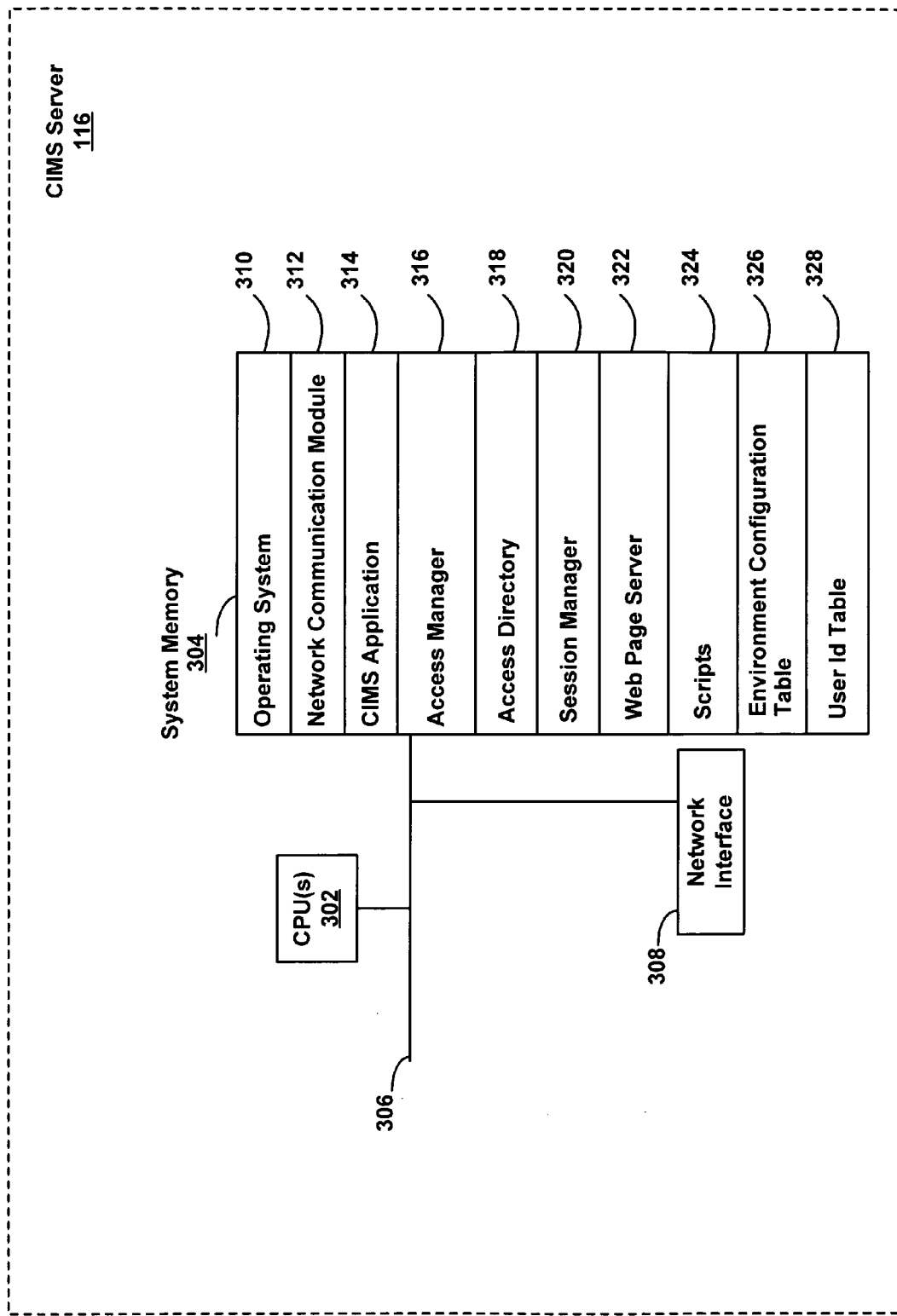
FIG. 3 is a block diagram of one embodiment of the CIMS server shown in FIG. 1.

FIG. 3 is a block diagram of the CIMS server 116 shown in FIG. 1. In some embodiments, the CIMS Server 116 (e.g., PC, mainframe, UNIX workstation, etc.) includes a local bus 306 coupled to system memory 304 spanning one or more memory hierarchies which can include one or more types of memory devices (e.g., RAM, ROM, hard discs, optical discs, etc.), one or more processors 302 and a network interface 308 for connecting to the network 108. The system memory 304 includes an operating system 310 (e.g., MICROSOFT WINDOWS NT, UNIX, etc.), a network communications module 312 (e.g., TCP/IP software), a CIMS application 314, an access manager 316, an access directory 318, a session manager 320, a Web page server 322, scripts 324, an environment configuration table 326 and a User Id table 328. Instructions are stored in a functional form in a computer readable storage medium for execution by one or more processors 302 in memory. In these illustrative examples, a hard disc and an optical disc are examples of a computer readable storage medium. RAM in system memory 304 is an example of a memory. A hard disc and an optical disc in system memory 304 is an example of a computer readable storage medium.

The operating system 310 and network communication module 312 operate as described above with respect to FIG. 2. The access manager 316 and access directory 318 manage user access requests (e.g., resource management requests) to the environments 110 in the data center 104. The session manager 320 establishes and maintains a connection with the client computer system 118 over the network 108. The Web page server 322 serves Web pages 122 to the client computer system 118. The Web pages 122 include various mechanisms for facilitating communication between the client computer system 118 and the CIMS server 116, as described more fully with respect to FIG. 4. The CIMS application 314 manages data flow between the environment configuration database 112 and the central repository 114. It receives user requests via the Web page server 322 and generates scripts 324 for implementing the user's request, such as the password change process described with respect to FIGS. 6A-6B. The environment configuration table 326 and User Id table 328 include data describing the environments 110 and the users who have access to the environments 110.

Web Pages for Password Management

FIGS. 4a-4d are illustrations of Web pages (e.g., HTML forms) for password management across multiple environments 110 of a technology outsourcing environment 100. In some embodiments, Web pages 122 are displayed in a browser window to a requestor or other authorized user and includes an administration tab 400 for password management.

Figure 4A:
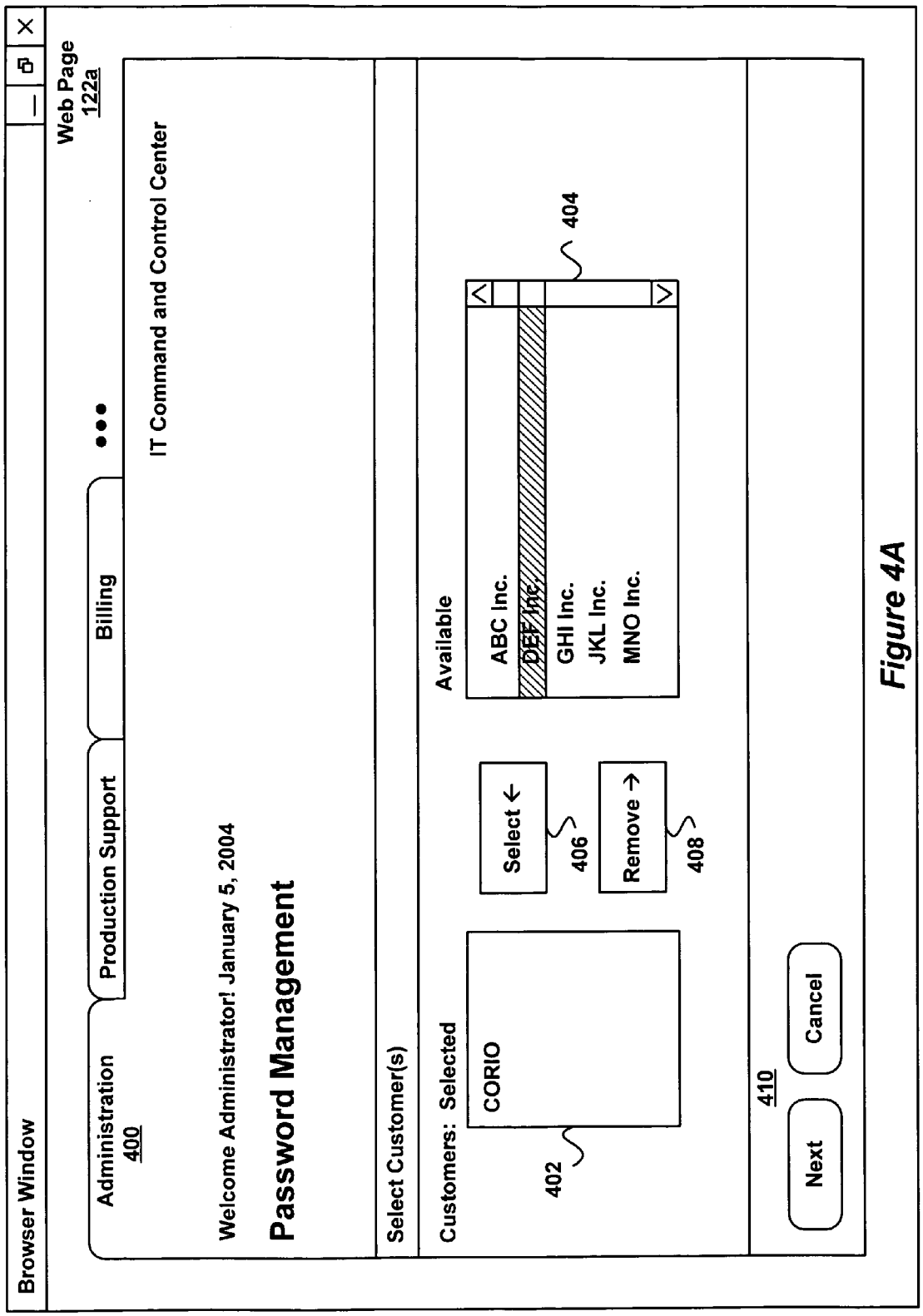
FIGS. 4*a*-4*d* are illustrations of one embodiment of Web pages for performing password management across multiple environments.

The Web page 122a shown in FIG. 4a is used for selecting customers, and can be the first Web page of a series of Web pages 122a . . . 122d that are presented to a requester to facilitate password management. The requestor can be an ASP administrator or a customer administrator who can select multiple customers. The administration tab 400 includes text areas 402 and 404, a select button 406, a remove button 408 and control buttons 410 (e.g., Next, Cancel). The text area 404 displays the customers that are available for password management (e.g., ABC Inc., DEF Inc., etc.). The text area 402 displays the customer selected for password management (e.g., CORIO). The select and move buttons 406, 408, are used to select and remove customers from the text area 402. The control buttons 410 are used to load the next Web page 102b in the series or to cancel the current operation, respectively.

Figure 4B:
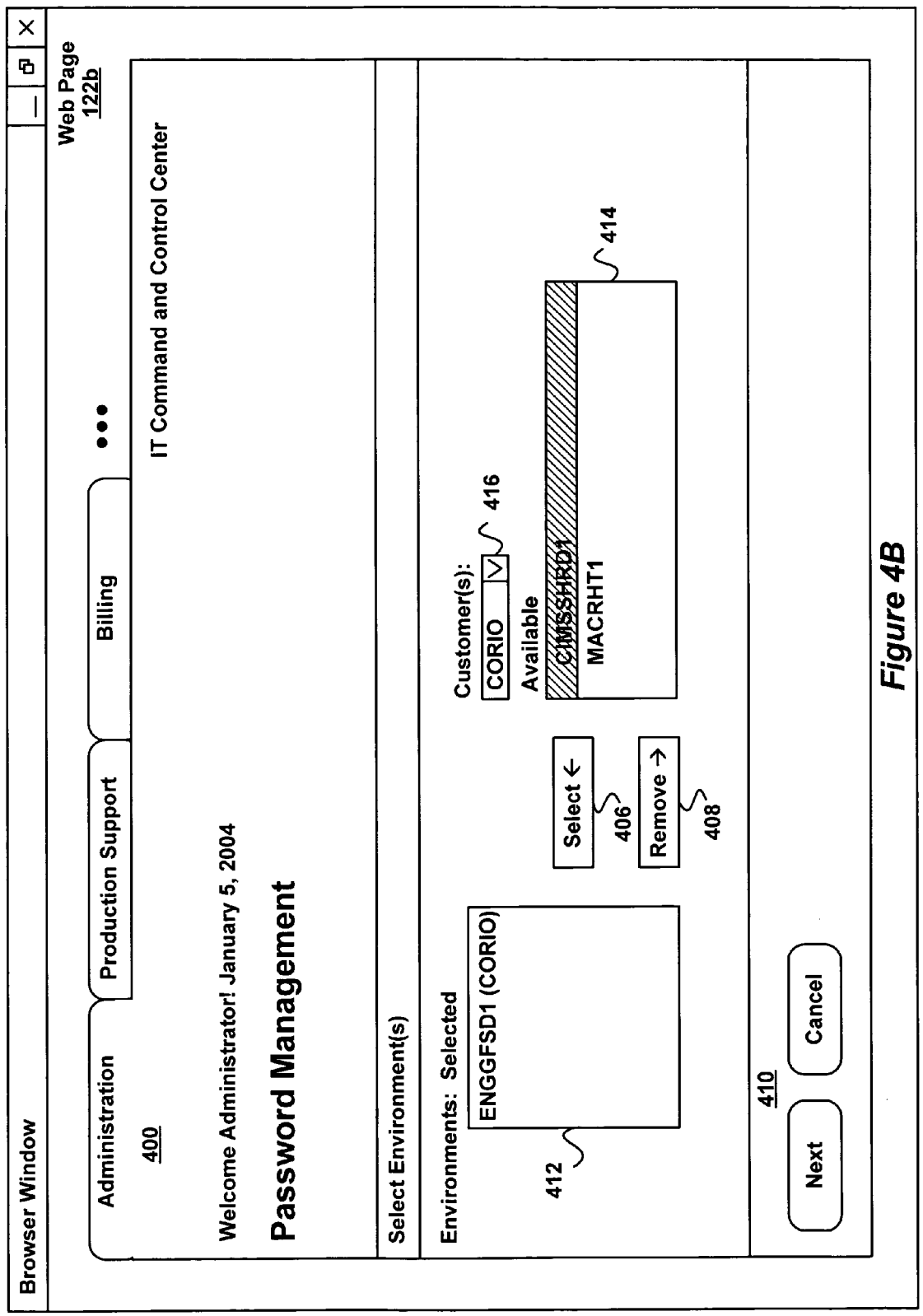

FIG. 4b is an illustration of a Web page 122b for selecting customer environments for password management. The Web page 122b includes text areas 412, 414, a select area 416, a select button 406, a remove button 408 and controls 410 (e.g., Next, Cancel). The text area 414 displays the environments that are available for password management (e.g., CIMSHRD1, etc.). The text area 412 displays the environment(s) selected by the user for password management (e.g., ENGG-FSD1). The select area 416 enables the selection of a customer from the list of selected customers in window 402. The select and move buttons 406, 408, are used to select and remove customers from window 412. The control buttons 410 (Next, Cancel) are used to load the next Web page 102c in the series or to cancel the current operation, respectively.

Figure 4C:
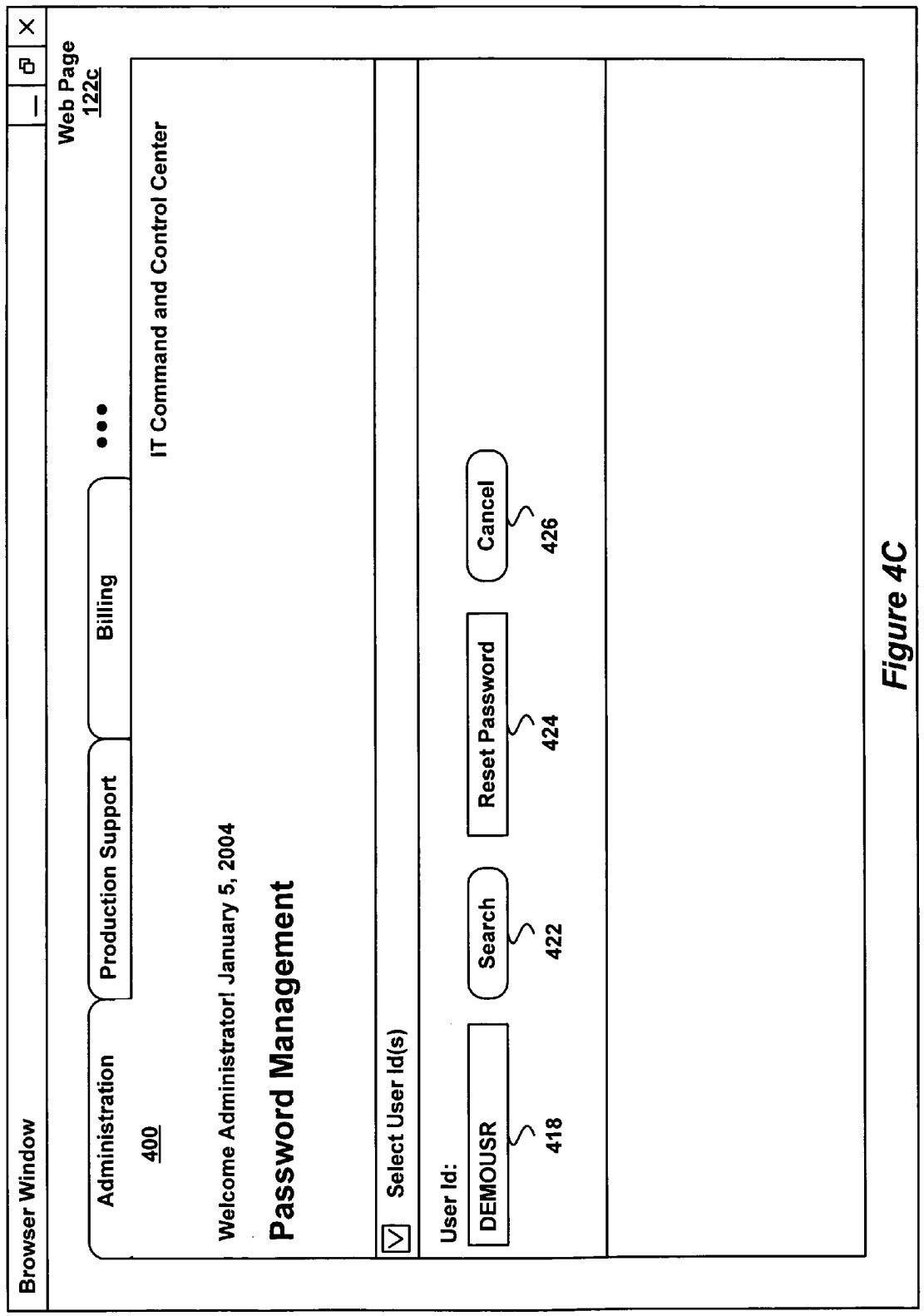

FIG. 4c is an illustration of a Web page 122c for selecting User Ids for password management. The Web page 122c includes a select area 418, a search button 422, a reset password button 424 and a cancel button 426. The select area 418 displays the User Ids that are available for password management (e.g., DEMOUSR). The search button 422 initiates a search through the available User Ids using a user defined search pattern (e.g., all users with a last name starting with the letter "G"), which is entered by the user in response to search dialogue box (not shown) which is displayed to the user when the search button 422 is clicked. The reset password button 424, when clicked, will reset the password(s) for the selected User Id(s). The cancel button 426 will cancel the current operation.

Figure 4D:

FIG. 4d is an illustration of a Web page 122d for resetting passwords. In some embodiments, the user administrator can select between three radio buttons 428: a) set a password for each User Id displayed, b) apply the same password to all User Ids below, or c) apply the same password to the same User Ids displayed. For example, in FIG. 4d, the second radio button 430 is selected to apply the same password to all User Ids. The display select area 432 includes columns for displaying selected customers, customer environments and, for each environment, a list of User Ids assigned a password for accessing the environment. For the example illustrated, a checkbox for customer Enterprise 1 was selected. Enterprise 1 has four environments: Test 1, Test 2, Development and Production. It should be apparent, however, that more or fewer environments can be selected based on the scope of the request. For each environment, a list of User Ids is presented to the requestor. Note that only the first User Id "00392304" is shown for each environment. Other User Ids can be viewed by clicking the up arrow button in the User Id column of the select area 432. For each User Id, the requestor can enter a new password in a first text area 434 and confirm the entered password in a second text area 436. An auto generate button 420 is included for automatically generating passwords.

The series of web page 122*a* . . . 122*d* are only one example of providing an interface for delegating a resource management task to a customer. It should be apparent, however, that other tasks can be delegated in a similar manner to any secure operation, including without limitation other password management tasks, such as creating new passwords or deleting passwords, or non-administrative tasks, such as providing access to certain application modules, disk drives or any other security-related function. In some embodiments, user privileges can be managed, such as limiting a user's access to or ability to modify certain database records, or to restrict access to certain applications or application versions.

Password Reset Process

Figure 5A:
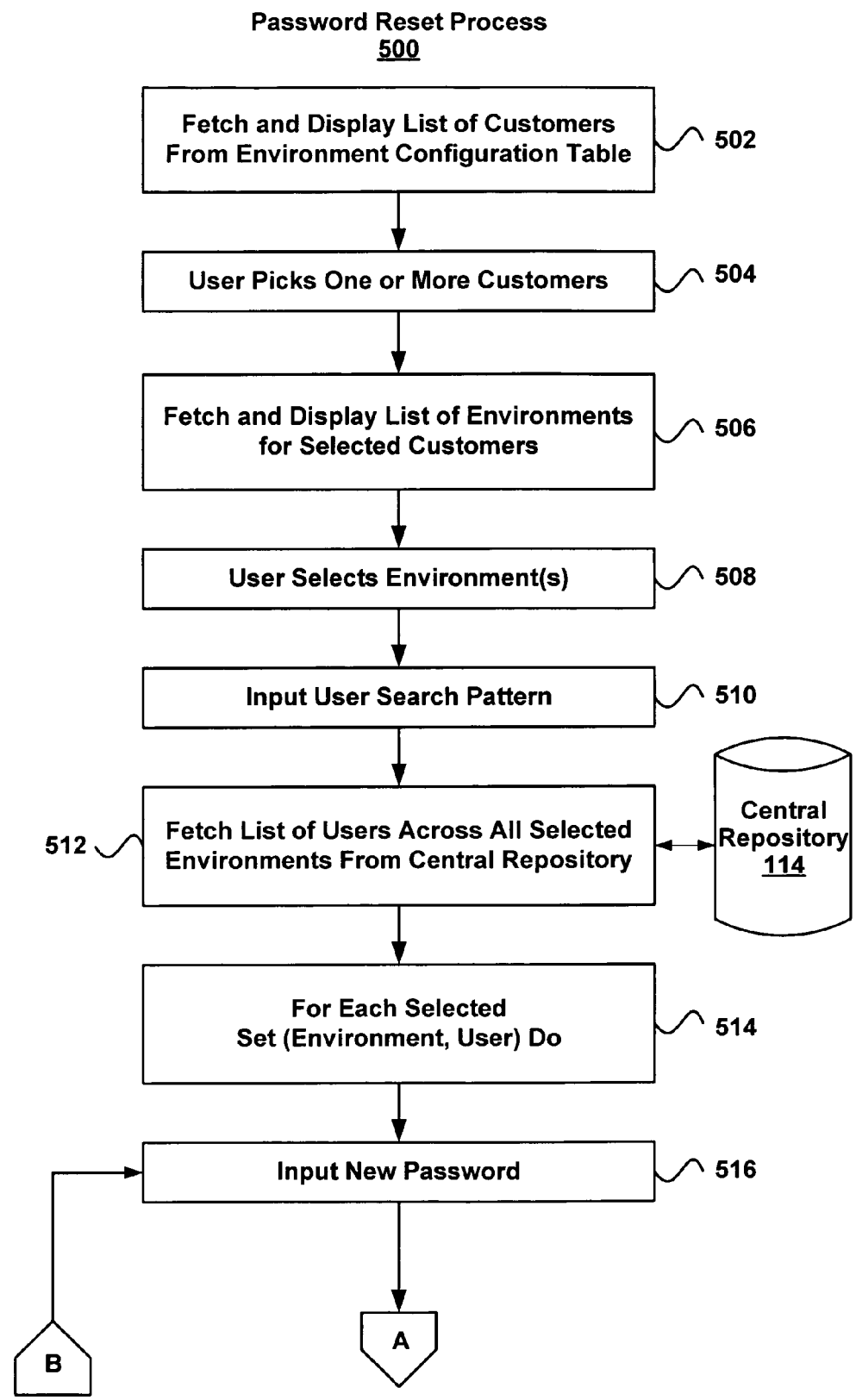
FIGS. 5*a* and 5*b* are flow diagrams of one embodiment of a password reset process for automatically resetting user passwords.
Figure 5B:
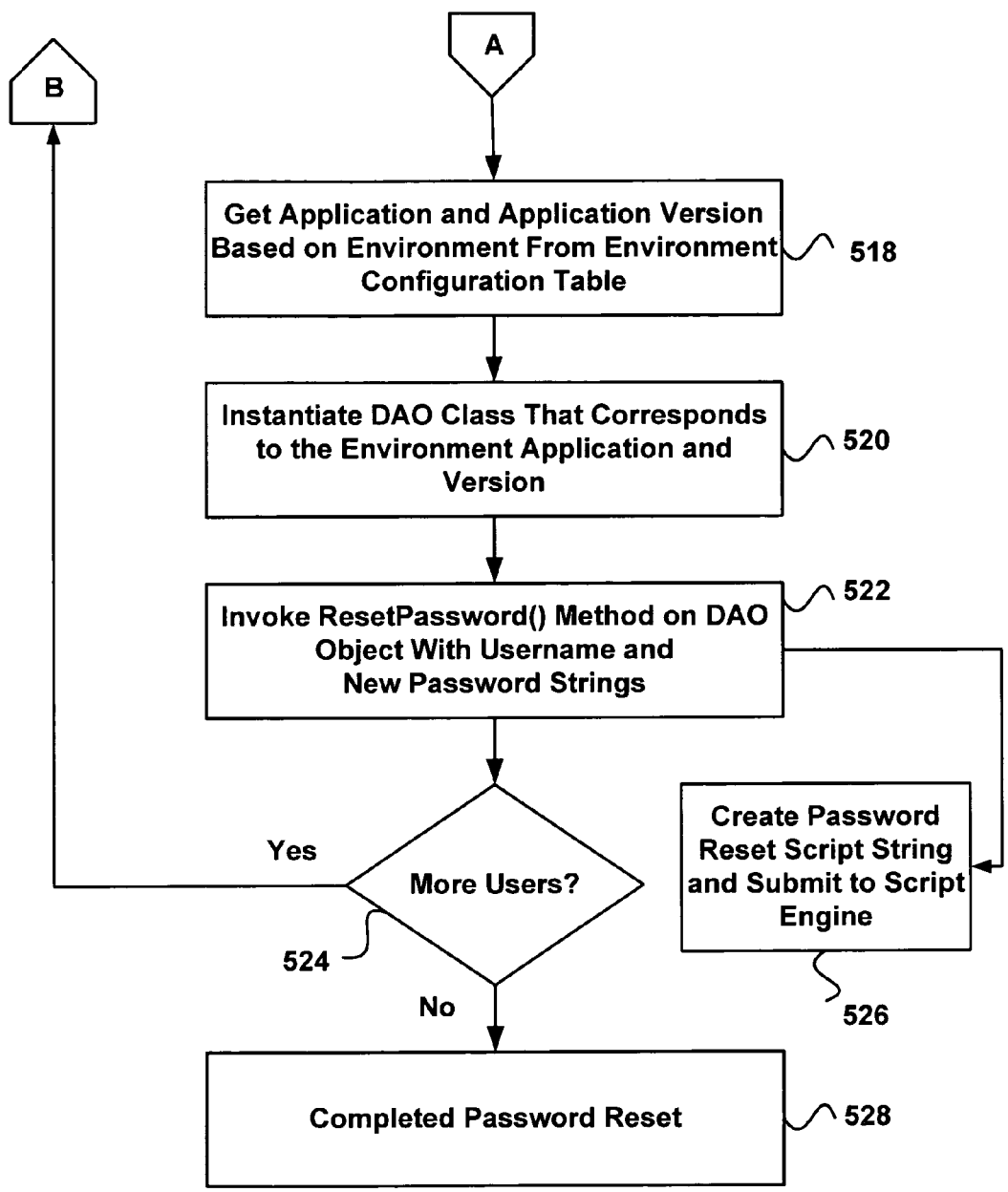

FIGS. 5*a* and 5*b* are flow diagrams of a password reset process 500 for automatically resetting passwords across multiple environments. While the process 500 described below includes a number of steps that appear to occur in a specific order, it should be apparent that the process steps are not limited to any particular order, and, moreover, the process 500 can include more or fewer steps, which can be executed serially or in parallel (e.g., using parallel processors or a multi-threading environment). Also, it should be apparent that the password reset process 500 described below is not limited to single sign-on solutions. Rather, it can be used to create, delete, reset or otherwise modify multiple passwords for a single user or multiple users across multiple environments, applications and application versions.

In some embodiments, the process 500 starts by fetching and presenting to a requestor a list of customers from a customer and environment configuration table (step 502). This step can be achieved by serving Web pages (e.g., Web pages 122*a* . . . 122*d*) to the requester from a Web page server (e.g., Web page server 322) for display in a browser window, or through an automated batch process. The requestor can then select one or more customers from the customer list for password reset (step 504), and a list of environments (e.g., environments 110) associated with the selected customer(s) are fetched and presented to the requester (step 506). The requestor can then select one or more environments from the environment list for password reset (step 508). The requestor is then prompted to input a User Id search pattern or criteria to search a central repository (e.g., central repository 114) for user information, such as User Ids (step 510). A list of User Ids is fetched from the central repository (step 512). For each selected environment/User Id pair, the requestor is prompted to enter a new password (step 516). The name(s) and version (s) of the application(s) running in the selected environments are retrieved from the customer and environment configuration table (step 518). In some embodiments, more users can be added via a separate search using, for example, a "shopping cart" approach, and then processed together after the search is complete. Such an embodiment would provide greater efficiencies and performance. In yet another embodiment, batch processing can be used to import or upload a list of users to be processed.

In some embodiments, a data access object is instantiated for each application version that corresponds to the selected environment (step 520). A resetPassword( ) method can then be invoked on the data access object with the User Id and new password strings (step 522). A password reset script (e.g., a UNIX shell script) is generated which includes calls to the appropriate application utilities for changing passwords (e.g., the UNIX command "% passwd") using the data access object (step 526). If more User Ids are to undergo password reset (step 524), then the process 500 is repeated for those User Ids starting at step 516; otherwise, the process 500 is terminated.

One example of a resetpassword( ) method framework is as follows:

```
resetPassword( )
    for selected customers {
        for each selected customer environment {
            for each selected user in that environment {
                execute script specialized for that environment to
    reset the password
            }
        }
    }
```

In the example method shown above, nested loops are used to execute a script specialized for each selected user in a selected customer environment. It should be apparent, however, that the other methods can be implemented depending upon the architecture of the technology outsourcing environment and the particular database and application software used in the environments. Such methods can be programmed using well-known programming or script languages.

Data Schema

TABLE I below is an example of an environment configuration table (e.g., environment configuration table 326) for use in the process 500. It should be apparent that more or fewer parameters can be included in the environment configuration table and still provide the benefits of the disclosed embodiments.

TABLE I

Example Environment Configuration Table

| Parameter Type | Parameter String |
|---|---|
| Application | MS Office |
| Application Version | 2003 |
| Customer | ABC Inc. |
| Environment | T1(Training Environment No. 1) |
| Server Type | MS Windows Small Business Server |
| Server Name | Server 01 |

In some embodiments, the environment configuration table includes six parameters, including: a) the name of the application, b) the application version, c) the name of the customer, d) the name of the environment hosting the application, e) the type of server hosting the application, and f) the name of the server hosting the application. In this example, the customer "ABC Inc." has been assigned a training environment "T1" for hosting MS Office 2003 on server/machine "Server 01."

In response to a user request, these six parameters can be included in a script (e.g., UNIX shell script) for execution by an operating system (e.g., UNIX) or script engine. In some embodiments, the scripts can be executed using the architecture described in U.S. application Ser. No. 10/930,284, filed Aug. 30, 2004, entitled "Database Backup, Refresh and Cloning System and Method," which application is incorporated by reference herein in its entirety.

The scripts use the parameters, together with one or more O/S utilities or other programs to perform administrative tasks, such as password management. The parameters can be stored as variable length integers, characters or any other suitable data type. In some embodiments, a different script can be generated for each version of an application.

TABLE II below is an example of a User Id table (e.g., User Id Table 326) for use in the process 500. It should be apparent that more or fewer parameters can be included in the User Id table and still provide the benefits of the disclosed embodiments.

TABLE II

Example of a User Id Table

| Parameter Type | Parameter Name |
|---|---|
| Customer | ABC Inc. |
| Environment | T1 (Training) |
| UserId | 139232 |
| FirstName | John |
| LastName | Doe |
| UserType | Trainee |
| LastUpdateTime | Jan. 1, 2004, 2:00 a.m., PST |

In some embodiments, the User Id table includes seven parameters, including: a) the name of the customer, b) the name of the environment, c) the User Id, d) the first name of the user associated with the User Id, e) the last name of the user associated with the User Id, f) the user type, and g) the last update time. In this example, a user "John Doe" of customer "ABC Inc." has a User Id of "139232." John Doe is a "trainee." The User Id table was last updated on Jan. 1, 2004, at 2:00 a.m., PST. The last update time can be used to facilitate an update schedule for periodically updating the central repository (e.g., every 24 hours), as well as provide an indication of data staleness. It should be apparent that the identification of the User, User Id or account is not restricted to the parameters in Table II. Rather, other search criteria or parameters can be used to identify a user or a set of users, including but not limited to, a set of users in a particular location, or a set of users for a particular customer, etc.

Scheduler Process

Figure 6:
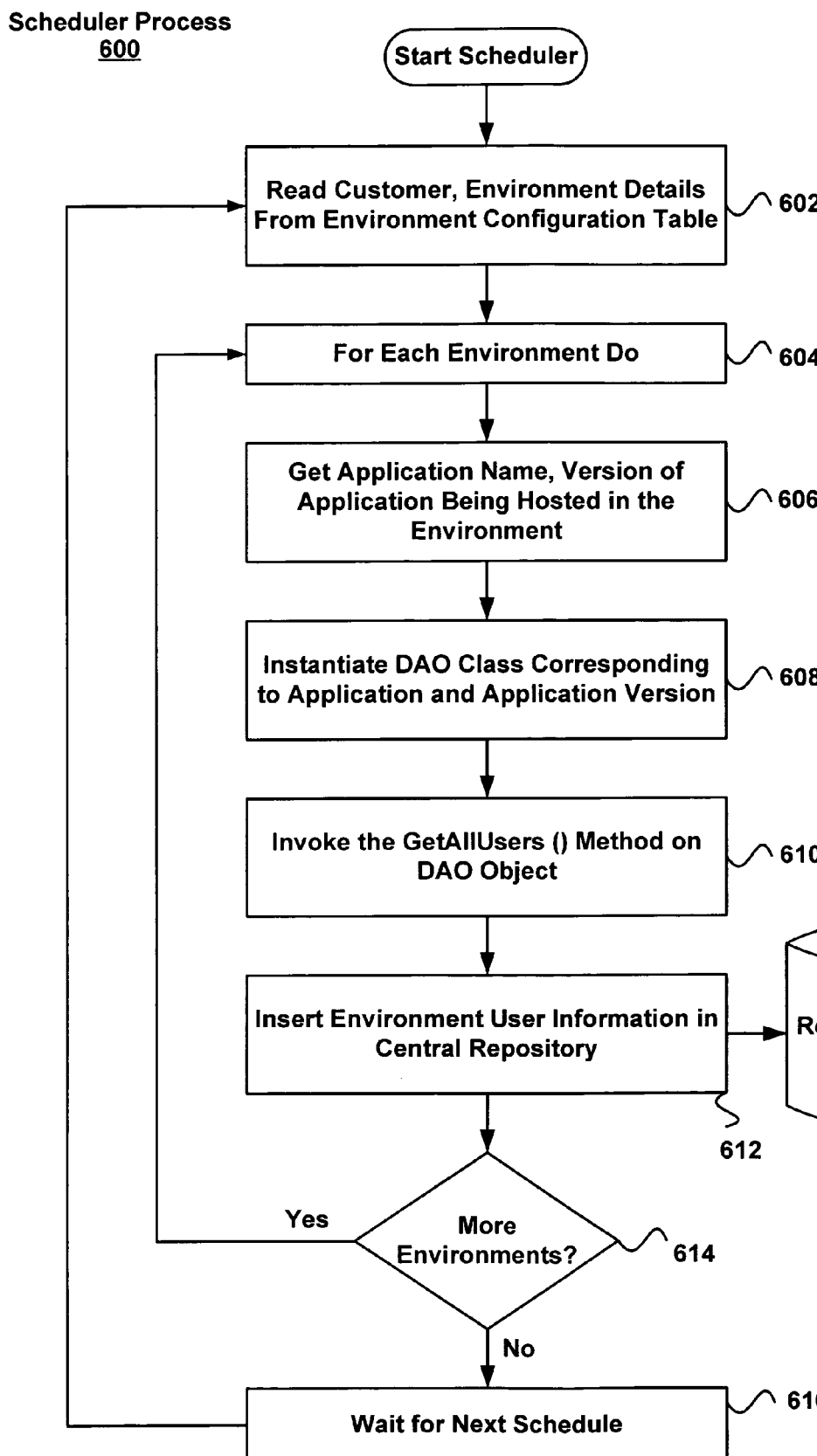
FIG. 6 is a flow diagram of one embodiment of a scheduler process for automatically refreshing or updating a central repository used for delegating resource management tasks to customers.

FIG. 6 is flow diagram of a scheduler process 600 for automatically refreshing or updating a central repository for use in delegating resource management tasks to customers. While the process 600 described below includes a number of steps that appear to occur in a specific order, it should be apparent that the process steps are not limited to any particular order, and, moreover, the process 600 can include more or fewer steps, which can be executed serially or in parallel (e.g., using parallel processors or a multi-threading environment).

To ensure that the central repository includes all of the current User Ids for all the environments owned by a customer, a scheduler process is periodically invoked using, for example, a script that is triggered at predetermined time (e.g., every morning at 2:00 a.m., Pacific Time). The process 600 begins by reading customer and environment data from the environment configuration table (step 602). For each environment (step 604), the name(s) and version(s) of the application(s) hosted in the environment are read from the environment configuration table (step 604). A data access object corresponding to the application version is instantiated (step 608). A getAllUsers( ) method is invoked on the data access object (step 610). Environment user information (e.g., User Ids) are inserted in the central repository using the data access object (step 612). If there are more environments to be processed (step 614), then the process 600 is repeated for those environments starting at step 604; otherwise, the scheduler process waits for the next scheduled update time (step 616).

One example of a getAllUsers [ ] method framework is as follows:

```
getAllUsers( )
    for all customers {
                    for each customer environment {
                                    get the list of all Users;
                    }
            get the unique list of all Users for a customer;
    }
```

In the example method shown above, nested loops are used to retrieve a list of all users for each customer environment. It should be apparent, however, that the other methods can be implemented depending upon the architecture of the technology outsourcing environment and the particular database and application software used in the environments. Such methods can be programmed using well-known programming or script languages.

Managed Security Structure

Figure 7:
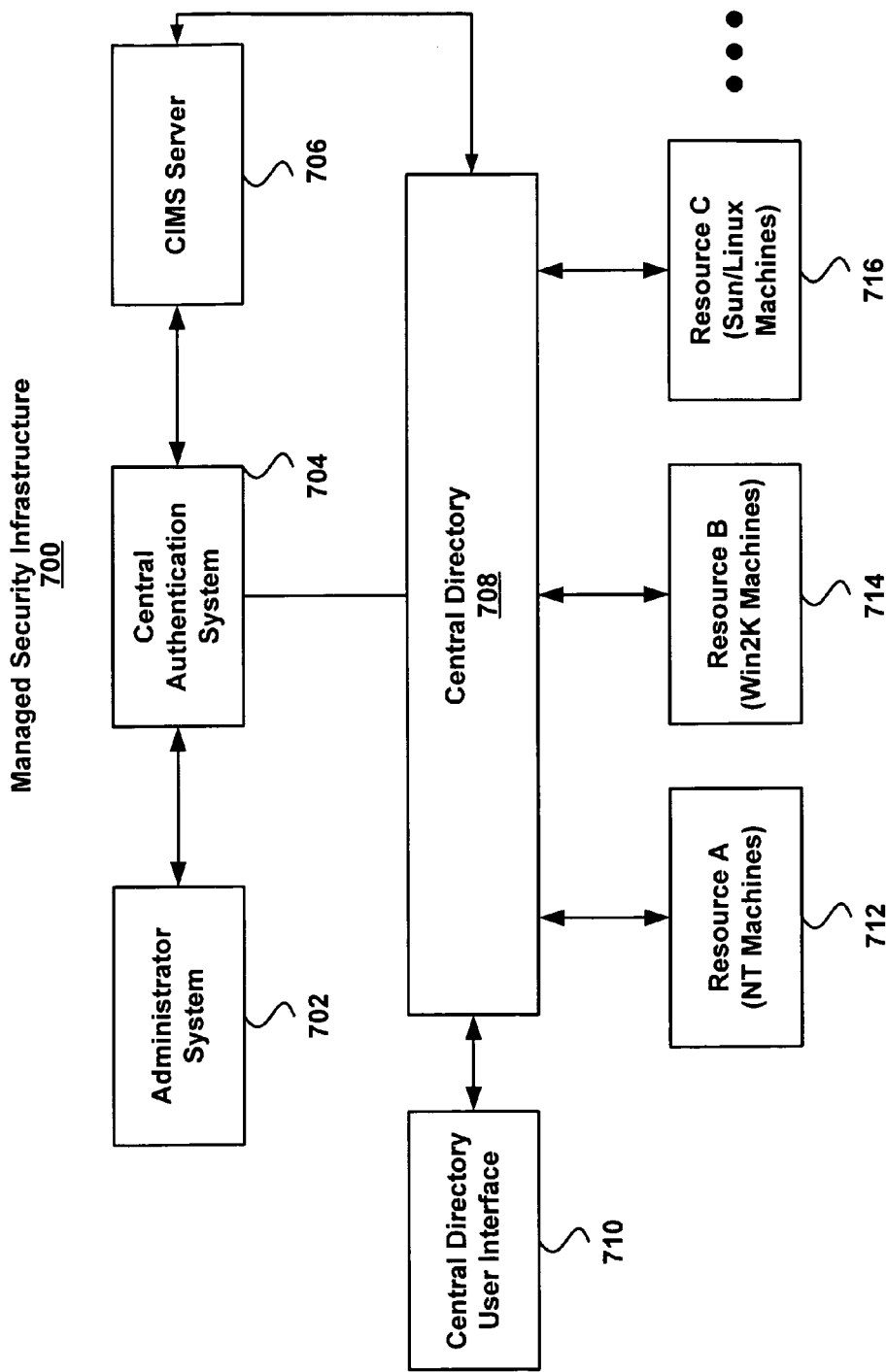
FIG. 7 is a block diagram of one embodiment of a managed security structure for delegating resource management tasks to customers.

FIG. 7 is a block diagram of a managed security structure (MSS) 700 used for delegating resource management tasks to customers. The MSS 700 includes an administrator system 702, a central authentication system 704, a CIMS server 706, a central directory 708, a central directory user interface 710 and managed resources 712, 714 and 716. It should be apparent that more or fewer resources can be included in the MSS 700, as needed, depending upon its design.

The CIMS server 706 provides authentication and access management information to a central authentication system 704. The central authentication system 704 is coupled to the central directory 708 receiving authorization information for users and authenticating users. In some embodiments, the central directory 708 is a lightweight directory access protocol (LDAP) server, such as the Active Directory™ LDAP developed by Microsoft Corporation (Redmond, Wash.).

In some embodiments, the central directory 708 includes a database for storing user credentials and includes information regarding organizations, users, groups and resources. The central directory 708 provides centralized authentication and authorization to the managed resources 712, 714 and 716. Group policies can be set up in the central directory 708 by an administrator via the central directory user interface 710. In some embodiments, a pluggable authentication module (PAM) (e.g., as defined in Open System Foundation (OSF), distributed computing environment (DCE) RFC 86.0) provides mechanisms for open source servers and workstations (e.g., LINUX) to authenticate against the central directory 708 and to manage passwords in the central directory 708.

In some embodiments, the MSS 700 provides centralized controlled access to privileged O/S accounts for one or more managed resources 712, 714 and 716. Organization, user, group and resource objects are managed centrally on the central directory server 708. Preferably, the MSS 700 provides flexible, on-demand network connections and processes for activating and deactivating users on one or more resources 712, 714 and 716 via the Internet. For example, if there is a service request that requires instant access to an environment, server or object, the access can be granted to an individual or individuals assigned to the problem for the duration of the problem until it is solved. When the problem is solved and the service request is closed the access can be revoked automatically. Note that if an individual is not assigned to the service request, or is not on duty at the time of the request, then he/she can be denied access. An example of an environment that can provide flexible, on-demand network connections and processes is described in U.S. patent application Ser. No. 10/412,549, filed Apr. 11, 2003, entitled "Method and Apparatus For Access Management."

In some embodiments, the CIMS server 706 passes input to an activation script (e.g., perl script) via a secure shell (SSH) to a domain controller located on the central directory server 708. The domain controller places the user in the appropriate privileged group and schedules log off information on the local severs based on the duration input from the CIMS server 706. For UNIX systems, a PAM is used to authenticate against the central directory server 708. For Windows systems, the Windows native authentication systems can be used to authenticate against the central directory server 708. In some embodiments, the administrator is automatically logged off of the local server, and the domain controller removes the administrator from the appropriate privilege group The foregoing description, for purpose of explanation, has referenced specific embodiments. However, the illustrative discussions above are not intended to be exhaustive or to limit the embodiments to the precise forms disclosed. Many modifications and variations are possible in view of the above teachings. The illustrative discussions and teachings were chosen and described to best explain the principles of the embodiments and their practical applications, to thereby enable others skilled in the art to best utilize the embodiments with various modifications as are suited to the particular use contemplated.

What is claimed is:

1. A method for performing a delegated resource management task in a technology outsourcing environment having a plurality of customers associated with different, respective network configuration environments, the method comprising:
   a computing device receiving, a request to perform a resource management task;
   responsive to receiving the request, the computing device selecting, a first computer having a first hardware platform and a first software platform, the first computer residing on a first computer network associated with a first customer of the plurality of customers;
   responsive to receiving the request, the computing device selecting a second computer having a second hardware platform and a second software platform, the second computer residing on a second computer network associated with a second customer of the plurality of customers, wherein a type of the first hardware platform is different from a type of the second hardware platform and a type of the first software platform is different from a type of the second software platform; the first customer is different than the second customer in the technology outsourcing environment, wherein the network configuration environments for the respective plurality of customers are stored on a central repository server coupled to a centralized identity management server that is configured to perform the resource management task; and
   responsive to selecting the first computer and the second computer, the computing device automatically generating one or more scripts to perform the resource management task on the first computer and the second computer, wherein the one or more scripts are configured to be executed using the first hardware platform and the first software platform on the first computer and using the second hardware platform and the second software platform on the second computer to perform the resource management task responsive to the first computer and the second computer executing the one or more scripts.

2. The method of claim 1, wherein the resource management task is password management.

3. The method of claim 2, wherein password management includes password resetting.

4. The method of claim 2 further comprising:
   the computing device selecting one or more user identifiers associated with the first computer network and the second computer network; and
   the computing device performing the password management using the one or more user identifiers.

5. The method of claim 4, wherein the one or more user identifiers are stored in a central repository which is configured to store information for users of the first computer network associated with the first customer of the plurality of customers and the second computer network associated with the second customer of the plurality of customers.

6. The method of claim 5, wherein the central repository is updated on a periodic basis.

7. The method of claim 1, further comprising:
   responsive to receiving the request, the computing device selecting a first application version from a plurality of application versions associated with the first software platform for the first computer and selecting a second application version from the plurality of application versions for the second software platform for the second computer, wherein the one or more scripts perform the resource management task with the first application version on the first software platform and with the second application version on the second software platform when the one or more scripts are executed on the first computer and the second computer.

8. The method of claim 1, wherein the receiving and selecting steps are implemented using Web pages.

9. The method of claim 1 further comprising:
   responsive to receiving the request, the computer selecting a first operating system command for a first operating system associated with the first software platform for the first computer and selecting a second operating system command for a second operating system for the second software platform for the second computer, wherein the one or more scripts perform the resource management task using the first operating system command for the first operating system and the second operating system command for the second operating system when the one or more scripts are executed on the first computer and the second computer.

10. The method of claim 1 further comprising:
    responsive to receiving the request, the computer selecting one or more entries from a table, wherein the one or more entries in the table describe hardware platforms and software platforms for the first computer and the second computer; wherein the step of the computer automatically generating the one or more scripts comprises:
    responsive to selecting the first computer and the second computer, the computer automatically generating the one or more scripts to perform the resource management task on the first computer and the second computer based on the one or more entries selected from the table for the first computer and the second computer, wherein the one or more scripts are configured to be executed using the first hardware platform and the first software platform on the first computer and using the second hardware platform and the second software platform on the second computer to perform the resource management.

11. The method of claim 1, wherein the type of the first hardware platform is different from the type of the second hardware platform and the type of the first software platform is different from the type of the second software platform such that a script generated for the type of the first hardware platform and the type of the first software platform in the first computer does not execute as desired in the second computer having the type of the second hardware platform and the type of the second software platform in the second computer.

12. A method of performing a delegated resource management task in a technology outsourcing environment having a plurality of customers associated with different, respective network configuration environments, the method comprising:
a computing device fetching and presenting, a list of the plurality of customers;
the computing device receiving, a selection of one or more the plurality customers;
the computing device fetching and presenting, a list of computer networks associated with one or more selected customers;
the computing device receiving, a selection of at least two computer networks from the list of computer networks, wherein a first computer network in the at least two computer networks has a first computer residing on the first computer network in which the first computer has a first hardware platform and a first software platform and a second computer network in the at least two computer networks has a second computer residing on the second computer network in which the second computer has a second hardware platform and a second software platform, wherein a type of the first hardware platform is different from a type of the second hardware platform and a type of the first software platform is different from a type of the second software platform; wherein a first customer is different than a second customer in the technology outsourcing environment, wherein different, respective network configuration environments for the respective plurality of customers are stored on a central repository server coupled to a centralized identity management server configured to perform the resource management tasks;
the computing device fetching and presenting, a list of user identifiers associated with users having access to the selected at least two computer networks; and
for each selected user identifier, the computing device automatically generating one or more scripts to perform the resource management task on the first computer and the second computer, wherein the one or more scripts are configured to be executed using the first hardware platform and the first software platform on the first computer and using the second hardware platform and the second software platform on the second computer to perform the resource management task for an application for operating in the selected at least two computer networks responsive to the first computer and the second computer executing the one or more scripts.

13. The method of claim 12, wherein the resource management task is password management.

14. The method of claim 12, wherein the list of user identifiers are stored in a central repository which is configured to store information for the users having the access to the at least two computer networks selected from the plurality list of computer networks.

15. The method of claim 14, wherein the central repository is updated on a periodic basis.

16. The method of claim 12, wherein the one or more scripts include the selection of the at least two computer networks and the list of user identifiers associated with the users having the access to the at least two computer networks, and further comprising
executing the one or more scripts to automatically perform the resource management task for the application.

17. The method of claim 16, wherein the selection of the at least two computer networks comprises information selected from at least one of a name of the application, a version of the application, a name of the customer, a name of the at least two computer networks selected, a type of a server hosting the application, and a name of the server hosting the application.

18. The method of claim 17, wherein the list of user identifiers comprises the information selected from the at least one of the name of the customer, the name of the at least two computer networks selected, a user identification, a first name of a user associated with the user identification, a last name of the user associated with the user identification, a user type, and a last update time.

19. A system for performing a delegated resource management task in a technology outsourcing environment having a plurality of customers associated with different, respective network configuration environments, the system comprising:
a computer-readable tangible storage device, configured to store information for users of at least two computer networks of a plurality of computer networks, wherein the at least two computer networks include different configurations and are associated with a first customer and a second customer of the plurality customers; wherein the first customer is different than the second customer in the technology outsourcing environment, wherein different, respective network configuration environments for the respective plurality of customers are stored on a central repository server coupled to a centralized identity management server to perform the resource management tasks;
a computer system comprising a Central Processing Unit (CPU), a memory, and a computer-readable storage medium,
first instructions to receive a request to perform a resource management task, select a first computer having a first hardware platform and a first software platform, the first computer residing on a first computer network, and select a second computer having a second hardware platform and a second software platform, the second computer residing on a second computer network, wherein a type of the first hardware platform is different from a type of the second hardware platform and a type of the first software platform is different from a type of the second software platform,
second instructions to automatically generate one or more scripts to perform the resource management task on the first computer and the second computer, wherein the one or more scripts are configured to be executed using the first hardware platform and the first software platform on the first computer and using the second hardware platform and the second software platform on the second computer to perform the resource management task responsive to the first computer and the second computer executing the one or more scripts; wherein the first instructions and the second instructions are stored on the computer-readable storage medium for execution by the CPU via the memory.

20. The system of claim 19, wherein the resource management task is password management.

21. The system of claim 20, wherein password management includes password resetting.

22. The system of claim 19, wherein a centralized identity management system is configured to receive one or more user identifiers associated with the first computer network associated with the first customer of the plurality of customers and the second computer network associated with the second customer of the plurality of customers, and to perform password management using the one or more user identifiers.

23. The system of claim 19, wherein the central repository is updated on a periodic basis.

24. The system of claim 19, wherein the computer system is configured to receive a selection of an application version from a plurality of application versions associated with the first computer network associated with the first customer of the plurality of customers and the second computer network associated with the second customer of the plurality of customers, and perform the resource management task on the selected application version.

25. The system of claim 19, wherein the computer system receives selections using Web pages.

26. A computer program product comprising:
a tangible computer-readable storage device;
first instructions, stored on the tangible computer-readable storage device, for receiving a request to perform a delegated resource management task in a technology outsourcing environment having a plurality of customers associated with different, respective network configuration environments;
second instructions, stored on the tangible computer-readable storage device, responsive to receiving the request, for selecting a first computer having a first hardware platform and a first software platform, the first computer residing on a first computer network associated with a first customer of the plurality of customers in response to receiving the request;
third instructions, stored on the tangible computer-readable storage device, responsive to receiving the request, for the computer selecting a second computer having a second hardware platform and a second software platform, the second computer residing on a second computer network associated with a second customer of the plurality of customers, wherein a type of the first hardware platform is different from a type of the second hardware platform and a type of the first software platform is different from a type of the second software platform the first customer is different than the second customer in the technology outsourcing environment, wherein network configuration environment for the respective plurality of customers are stored on a central repository server coupled to a centralized identity management server configured to perform the resource management task; and
fourth instructions, stored on the tangible computer-readable storage device, responsive to selecting the first computer and the second computer, for a computer automatically generating one or more scripts to perform the resource management task on the first computer and the second computer, wherein the one or more scripts are configured to be executing using the first hardware platform and the first software platform on the first computer and using the second hardware platform and the second software platform on the second computer to perform the resource management task responsive to the first computer and the second computer executing the one or more scripts.

27. A computer program product to perform a delegated resource management task in a technology outsourcing environment having a plurality of customers associated with different network configuration environment, the computer program product comprising:
a computer-readable storage device;
first instructions, stored on the computer-readable storage device for fetching and presenting a list of the plurality customers;
second instructions, stored on the computer-readable storage device for receiving a selection of one or more of the plurality of customers;
third instructions, stored on the computer readable storage device for fetching and presenting a list of computer networks associated with the selected one or more of the plurality of customers, wherein at least two of the computer networks having different configurations associated with a first customer and a second customer of the plurality of customers; wherein the first customer is different than the second customer in the technology outsourcing environment, wherein the network configuration environment for the respective plurality of customers are stored on a central repository server coupled to a centralized identity management server configured to perform the resource management tasks;
fourth instructions, stored on the computer-readable storage device for receiving a selection of the at least two of the computer networks from the list of computer networks, wherein a first computer network in the at least two of the computer networks has a first computer residing on the first computer network in which the first computer has a first hardware platform and a first software platform and a second computer network in the at least two of the computer networks has a second computer residing on the second computer network in which the second computer has a second hardware platform and a second software platform, wherein a type of the first hardware platform is different from a type of the second hardware platform and a type of the first software platform is different from a type of the second software platform:
fifth instructions, stored on the computer-readable storage device for fetching and presenting a list of user identifiers associated with users having access to the selected at least two of the computer networks; and
sixth instructions, stored on the computer-readable storage device for automatically performing, for each selected user identifier, a computer automatically generating one or more scripts to perform a resource management task on the first computer and the second computer, wherein the one or more scripts are configured to be executed using the first hardware platform and the first software platform on the first computer and using the second hardware platform and the second software platform on the second computer to perform the resource management task for an application for operating in the selected at least two of the computer networks responsive to the first computer and the second computer executing the one or more scripts.

* * * * *